United States Patent
Factor et al.

(10) Patent No.: US 10,958,416 B2
(45) Date of Patent: Mar. 23, 2021

(54) ENCRYPTED AND COMPRESSED DATA TRANSMISSION WITH PADDING

(71) Applicant: International Business Machines Corporation, Armonk, NY (US)

(72) Inventors: Michael Factor, Haifa (IL); Danny Harnik, Tel Mond (IL); Ronen Itshak Kat, Kokav-Yair (IL)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/199,268

(22) Filed: Nov. 26, 2018

(65) Prior Publication Data

US 2020/0169382 A1    May 28, 2020

(51) Int. Cl.
*H04L 9/06* (2006.01)
*G06F 3/06* (2006.01)

(52) U.S. Cl.
CPC .......... *H04L 9/0631* (2013.01); *G06F 3/0623* (2013.01); *G06F 3/0659* (2013.01); *G06F 3/0673* (2013.01); *H04L 2209/20* (2013.01); *H04L 2209/30* (2013.01)

(58) Field of Classification Search
CPC ............... H04L 9/0631; H04L 2209/30; H04L 2209/20; H04L 9/0894; G06F 3/0623; G06F 3/0673; G06F 3/0659; G06F 3/067; G06F 3/0608; G06F 3/0641
See application file for complete search history.

(56) References Cited

U.S. PATENT DOCUMENTS

| | | | |
|---|---|---|---|
| 5,778,395 A | 7/1998 | Whiting et al. | |
| 8,555,053 B1* | 10/2013 | Vitalo | G06F 13/382 713/153 |
| 2005/0015608 A1* | 1/2005 | Peterson | G06F 21/6209 713/193 |
| 2009/0307249 A1* | 12/2009 | Koifman | G06F 3/0659 |
| 2010/0313036 A1* | 12/2010 | Lumb | H04L 9/0894 713/189 |
| 2010/0313040 A1* | 12/2010 | Lumb | G06F 3/0623 713/193 |
| 2015/0052586 A1* | 2/2015 | Mills | H04L 63/0428 726/4 |
| 2015/0379276 A1* | 12/2015 | Glickman | G06F 21/602 713/193 |

(Continued)

OTHER PUBLICATIONS

Mark W. Storer et al., "Secure data deduplication", Proceedings of the 4th ACM international workshop on Storage security and survivability, 2008, pp. 1-10.

(Continued)

*Primary Examiner* — Cheng-Feng Huang
(74) *Attorney, Agent, or Firm* — Barry D. Blount (57) ABSTRACT

In some examples, a system for executing instructions can include a processor to detect data to be transmitted to a storage device in response to a write operation. The processor can also determine that the data comprises a compressible characteristic that enables compression of the data to a size below a threshold value. Additionally, the processor can generate a modified data block by encrypting the compressed data, and adding a padding to the compressed and encrypted data. Furthermore, the processor can transmit the modified data block to the storage device.

17 Claims, 6 Drawing Sheets

(56) References Cited

U.S. PATENT DOCUMENTS

| | | |
|---|---|---|
| 2016/0119133 A1* | 4/2016 | Ciet ................. H04L 9/0643 380/28 |
| 2017/0169233 A1 | 6/2017 | Hsu et al. |
| 2017/0170961 A1 | 6/2017 | Androulaki et al. |
| 2017/0235636 A1* | 8/2017 | Zhou ..................... G06F 3/06 714/764 |
| 2018/0034787 A1 | 2/2018 | Kamaraju et al. |
| 2018/0196947 A1 | 7/2018 | Davis et al. |
| 2019/0158271 A1* | 5/2019 | Lowry ................ H04L 9/065 |
| 2019/0215155 A1* | 7/2019 | Wang ................... H04L 9/14 |

OTHER PUBLICATIONS

Nathalie Baracaldo et al., "Reconciling end-to-end confidentiality and data reduction in cloud storage", Proceedings of the 6th edition of the ACM Workshop on Cloud Computing Security, 2014, pp. 21-32.

Hung Dang et al., "Privacy-Preserving Data Deduplication on Trusted Processors", 2017 IEEE 10th International Conference on Cloud Computing (CLOUD), 2017, pp. 66-73.

Wei Kang et al., "Compressing Encrypted Data: Achieving Optimality and Strong Secrecy via Permutations", IEEE Transactions on Information Theory, Dec. 2016, vol. 62, Issue 12, pp. 7153-7163.

Ram Pai, "DM: inplace compressed DM target", The Mail Archive (lwn.net), Jan 17, 2017. available at: https://www.mail-archive.com/linux-kernel@vger.kernel.org/msg1312702.html (retrieved Nov. 25, 2018).

* cited by examiner

ENCRYPTED AND COMPRESSED DATA TRANSMISSION WITH PADDING

BACKGROUND

The present disclosure relates to executing instructions with encrypted and compressed data, and more specifically, but not exclusively, to executing instructions based on encrypted and compressed data with padding.

SUMMARY

According to an embodiment described herein, a system for executing instructions can include a processor to detect data to be transmitted to a storage device in response to a write operation. The processor can also determine that the data comprises a compressible characteristic that enables compression of the data to a size below a threshold. Additionally, the processor can generate a modified data block by encrypting the compressed data, and adding a padding to the compressed and encrypted data. Furthermore, the processor can transmit the modified data block to the storage device.

In some embodiments, a system for executing instructions can include a processor to send a read request for data to a storage device. The processor can also determine that the requested data comprises a padding in response to receiving the requested data. Additionally, the processor can determine a number of bytes to remove from the data based on a length of the padding. Furthermore, the processor can extract raw data from the requested data by removing the number of bytes corresponding to the padding, decrypting a portion of the requested data excluding the padding, and decompressing the decrypted portion of the requested data. Additionally, the processor can execute an instruction with the raw data.

In yet another embodiment, a computer program product for executing instructions can include a computer readable storage medium having program instructions embodied therewith, wherein the computer readable storage medium is not a transitory signal per se. The program instructions can be executable by a processor to cause the processor to detect data to be transmitted to a storage device in response to a write operation. The program instruction can also cause the processor to determine that the data comprises a compressible characteristic that enables compression of the data to a size below a threshold value by compressing the data. Furthermore, the program instructions can cause the processor to generate a modified data block by encrypting the compressed data, and adding a padding to the compressed and encrypted data. Additionally, the program instructions can cause the processor to transmit the modified data block to the storage device.

DETAILED DESCRIPTION

Many storage systems have data reduction capabilities, which use compression and/or deduplication technologies in order to save space and better utilize the storage. This technique, depending on the actual content that is being stored, can reduce the amount of storage for data. However, many environments implement end-to-end encryption, which requires host side encryption of data as the data is transmitted from an application server. End-to-end encryption techniques increase protection of data from unauthorized user access, but the data that reaches the storage system is already in encrypted form and can no longer be compressed because the encrypted data has no compression or deduplication savings potential.

The techniques described herein enable host side encryption and compression. Accordingly, the techniques described herein can maintain length preserving compression on the host device by maintaining a uniform data block size of compressed data. The techniques can implement compression, while each encrypted block written to storage can be written with the original block size and offset. This enables the storage to manage the data layout and prevents the host device from executing additional functionality to manage the compressed blocks. In some embodiments, an example technique herein first compresses a data block, then encrypts the compressed data block, and then pads the encrypted and compressed data block to the original block size with highly compressible padding. For example, the padding can include any number of consecutive zero values combined with metadata indicating a length of the uncompressed data. The compressed, encrypted, and padded data block can be written to a storage device with the same length and offset as without compression and solely with encryption. In some embodiments, the storage device can compress the padding and gain the potential compression.

In some embodiments, techniques herein can be implemented in a virtual machine (VM) environment with a network attached storage that supports data reduction. If the VM environment, e.g. the hypervisor, chooses to encrypt all of the data as the data is transmitted to the storage, then the techniques herein can achieve that without losing all of the data reduction in the storage. In another example implementation, an enterprise database can use an all-flash enterprise storage system to store the database data, wherein the all-flash enterprise storage system is connected via a network and has compression capabilities. If an administrator encrypts all data at the database server, then all data reduction will be lost. The techniques herein prevent the loss of data reduction in this example.

Figure 1:
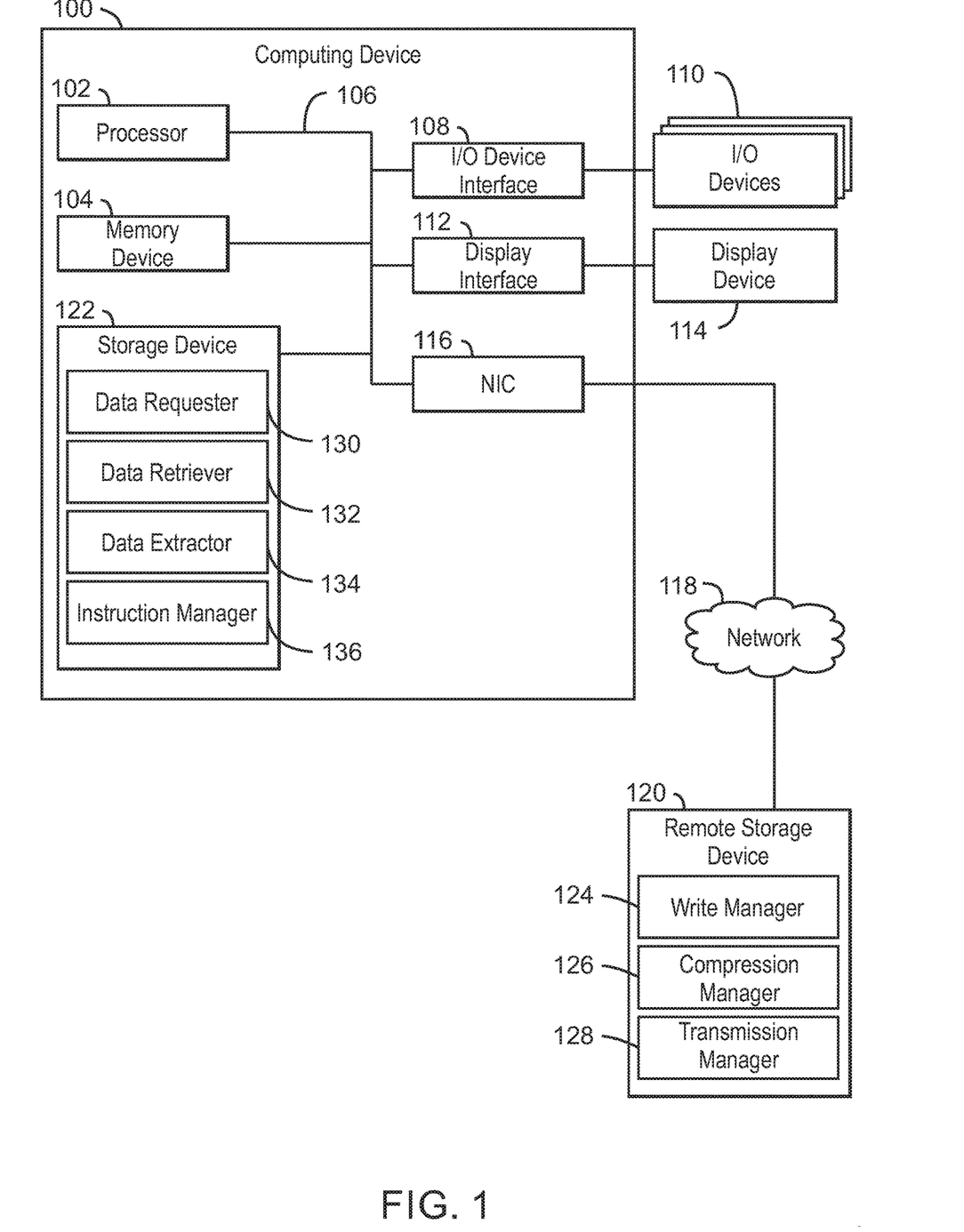
FIG. 1 depicts a block diagram of an example computing system that can execute instructions based on encrypted and compressed data with padding according to an embodiment described herein.

With reference now to FIG. 1, an example computing device is depicted that can execute instructions based on encrypted and compressed data with padding. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote storage device 120 may connect to the computing device 100 through the network 118.

The processor 102 may also be linked through the system interconnect 106 and NIC 116 to the remote storage device 120 that can include a hard drive, an optical drive, a USB flash drive, an array of drives, or any combinations thereof. In some examples, the remote storage device 120 may include data and applications used to execute instructions by the processor 102. In some examples, the remote storage device 120 can include a write manager 124, a compression manager 126, and a transmission manager 128. In some embodiments, for a write operation, the write manager 124 can detect data to be transmitted to a storage device in response to a write operation. The compression manager 126 can determine that the data comprises a compressible characteristic that enables compression of the data to a size below a threshold value. The transmission manager 128 can generate a modified data block by compressing the data, encrypting the compressed data, and adding a padding to the compressed and encrypted data. The transmission manager 128 can also transmit the modified data block to the storage device.

In some examples, the processor 102 can be linked through the system interconnect 106 to the storage device 122, which can include a data requester 130, a data retriever 132, a data extractor 134, and an instruction manager 136. In some embodiments, for a read operation, the data requester 130 can send a request for data to a storage device. In some examples, the data retriever 132 can determine that the requested data comprises a padding in response to receiving the requested data. The data retriever 132 can also determine a number of bytes to remove from the data based on a length of the padding. In some embodiments, the data extractor 134 can extract raw data from the requested data by removing the number of bytes corresponding to the padding, decrypting a portion of the requested data excluding the padding, and decompressing the decrypted portion of the requested data. Additionally, the instruction manager 136 can execute an instruction with the raw data.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the write manager 124, compression manager 126, transmission manager 128, data requester 130, data retriever 132, data extractor 134, and instruction manager 136 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the write manager 124, compression manager 126, transmission manager 128, data requester 130, data retriever 132, data extractor 134, and instruction manager 136 can be implemented with logic, wherein the logic, as referred to herein, can include any suitable hardware (e.g., a processor, among others), software (e.g., an application, among others), firmware, or any suitable combination of hardware, software, and firmware. Furthermore, in some embodiments, the write manager 124, compression manager 126, transmission manager 128, data requester 130, data retriever 132, data extractor 134, and instruction manager 136 can reside on a single computing system, such as the computing device 100.

Figure 2:
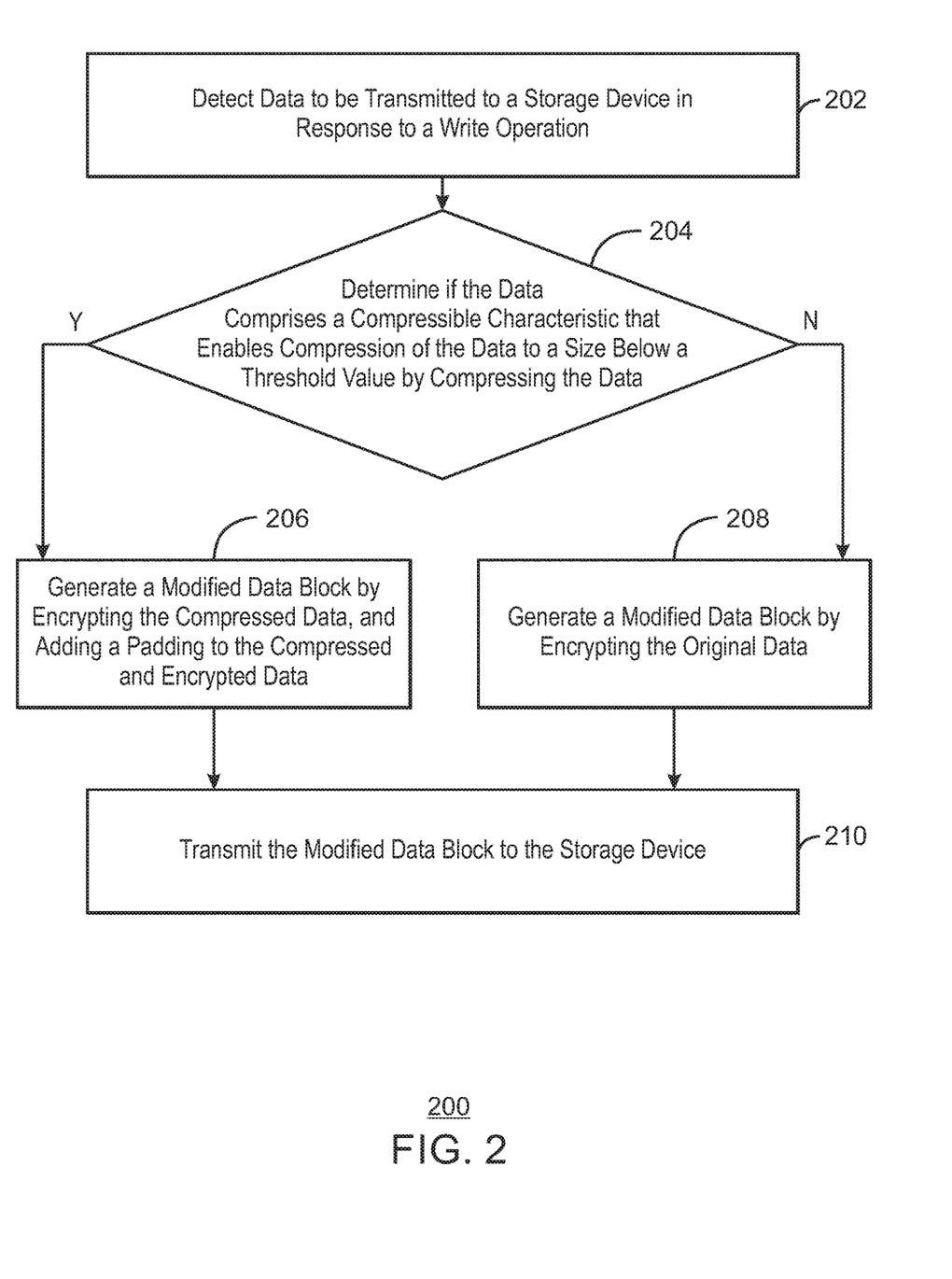
FIG. 2 is a process flow diagram of an example method that can execute write instructions based on encrypted and compressed data with padding according to an embodiment described herein.

FIG. 2 is a process flow diagram of an example method that can execute a write instruction based on encrypted and compressed data with padding. The method 200 can be implemented with any suitable computing device, such as the computing device 100 of FIG. 1.

At block 202, the write manager 124 can detect data to be transmitted to a storage device in response to a write operation. In some embodiments, the storage device can be a local storage device or a remote storage device, wherein the storage device comprises a space reduction capability that can benefit from padding. For example, the storage device can reside on a remote server. The write operation can transmit any number of data blocks from a local computing device to the storage device. In some embodiments, the write operation can transmit data for any suitable application, operating system, hardware device, sensor, and the like. The requested data, as referred to herein, can be a fixed or variable block size to enable operations performed at a data chunk level.

At block 204, the compression manager 126 can determine that the data comprises a compressible characteristic that enables compression of the data to a size below a threshold value. For example, the compression manager 126 can determine that a suitable compression technique applied to the data can result in a compression ratio that is below a threshold value. For example, this can be performed by compressing the data chunk. In one example, the compression technique can include lossless or lossy data compression. In some embodiments, the compression ratio can correspond to 20%, 30%, 40%, 50%, or any other suitable percentage. If the compression ratio is below a predetermined threshold ratio, the compression manager 126 can compress the data as discussed below in relation to block 206. If the compression ratio is above the predetermined threshold ratio, the compression manager 126 can indicate that compression is unnecessary and the data can be transmitted in an encrypted format at block 208 without compression or padding.

At block 206, the transmission manager 128 can generate a modified data block by encrypting the compressed data, and adding a padding to the compressed and encrypted data. The modified data block can include data compressed with any suitable compression technique and any suitable encryption technique applied to the compressed data. For example, the encryption technique can include advanced encryption standard techniques, Anubis encryption techniques, Grand Cru encryption techniques, and the like.

In some embodiments, the transmission manager 128 can add padding to the compressed and encrypted data, wherein the padding can include a sequence of zero or one values, or a highly compressible sequence of zero and one values. Accordingly, the padding can result in a sequence of highly compressible data. For example, the padding can include adding a "00000000" or "11111111" binary value to the end of the compressed and encrypted data. In some examples, the string of consecutive zero or one binary values can be any suitable length. In some embodiments, the padding can also include metadata indicating a number of bytes corresponding to the padding, a hash of the data in an uncompressed and unencrypted format, decryption information such as tweak information as part of an AES encryption, or an error correction code. In some embodiments, the transmission manager 128 can add the padding to a beginning or an end of the compressed and encrypted data. In some examples, the transmission manager 128 can alternate adding the padding to a beginning or an end of the compressed and encrypted data. For example, each consecutive modified data block can alternately include the padding at the beginning and the end of the modified data blocks respectively. Therefore, the padding of two consecutive modified data blocks can be combined and enable enhanced compression of the padding by a storage device.

In some embodiments, the transmission manager 128 can implement a data pipeline to compress and encrypt the data with a single buffer. In some examples, the transmission manager 128 can compress and encrypt the data via a hardware accelerator. In some embodiments, in order to hide the exact size of the compressed data chunk, the transmission manager 128 can add a random number of bytes to the compressed data prior to encryption. The number of random bytes can be included in a designated location within the encrypted data to enable a host device to remove these extra bytes after decrypting the modified data in response to a read operation. For example, the last byte in the data before encryption can indicate the number of random bytes that were added to the data. For example, if the data chunk compresses to X bytes, one can add a random number Y of extra bytes (with Y between 0 and 63, or any other suitable range). The encryption will then encrypt X+Y+1 bytes, in which the first X bytes constitute the compressed data, the next Y bytes are any arbitrary string of Y bytes, and the last byte is an encoding of the number Y. In another embodiment, the number Y of extra bytes is not chosen randomly, but rather is selected so that X+Y+1 is of a size which is an exact multiplication of the encryption block size (for example, in AES encryption the block size is either 16 or 32 bytes).

At block 210, the transmission manager 128 can also transmit the modified data block to the storage device. For example, the transmission manager 128 can write the modified data block to local storage or remote storage in response to a write operation. In some embodiments, the modified data block can be transmitted by any suitable network protocol and can implement end-to-end encryption, while enabling the storage device to compress the padding of the modified data blocks.

The process flow diagram of FIG. 2 is not intended to indicate that the operations of the method 200 are to be executed in any particular order, or that all of the operations of the method 200 are to be included in every case. Additionally, the method 200 can include additional operations. For example, the method 200 can also include determining that the data does not comprise the compressible characteristic, and generating the modified data block by encrypting the data without compressing the data or adding a padding to the data.

Figure 3:
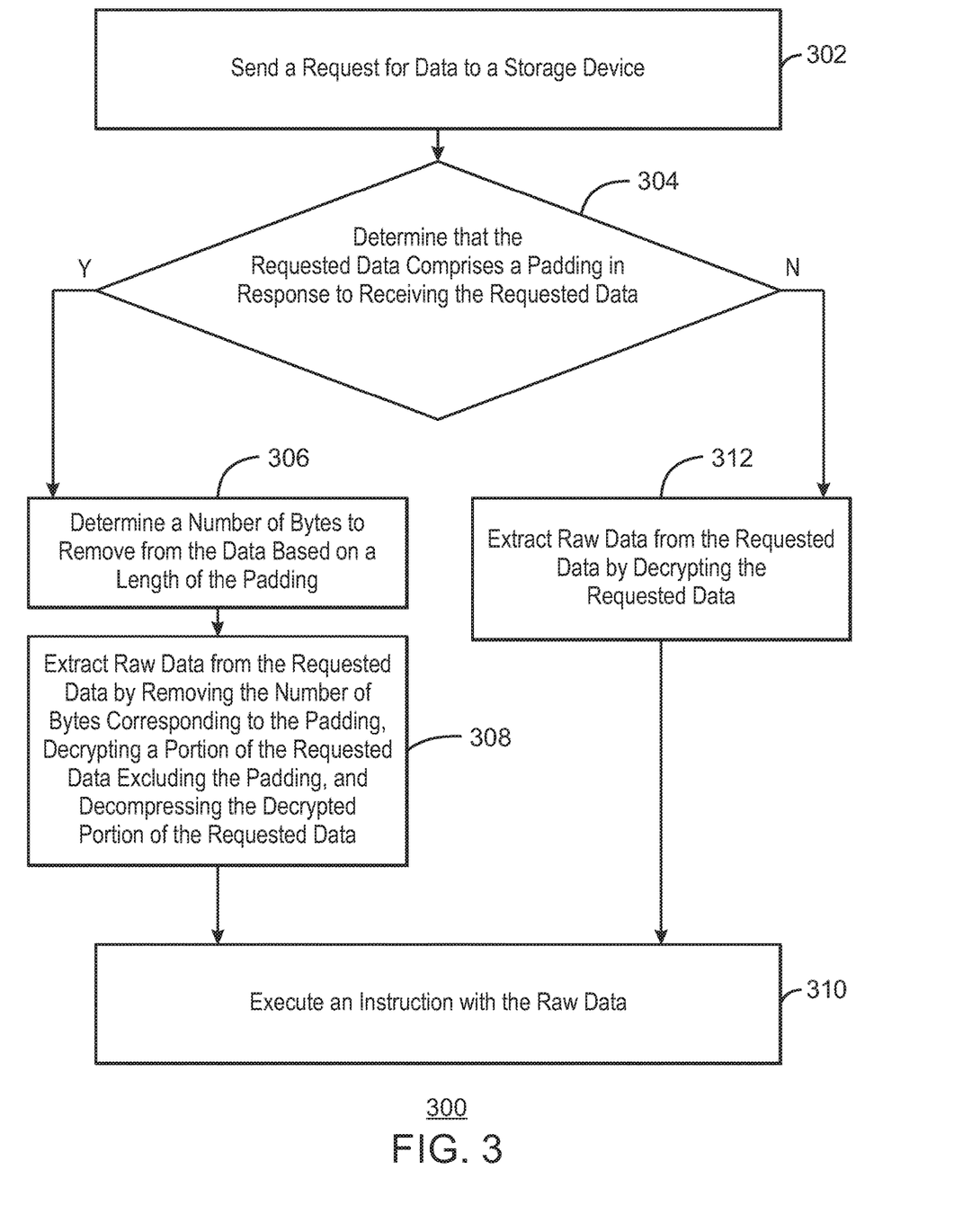
FIG. 3 is a process flow diagram of an example method that can execute read instructions based on encrypted and compressed data with padding according to an embodiment described herein.

FIG. 3 is a process flow diagram of an example method that can execute a read instruction based on encrypted and compressed data with padding. The method 300 can be implemented with any suitable computing device, such as the computing device 100 of FIG. 1.

At block 302, a data requester 130 can send a request for data to a storage device. For example, the data requester 130 can detect a read operation and send a request to local or remote storage for data to be used by the read operation. The data can correspond to any suitable application, operating system, hardware device, sensor, and the like.

At block 304, the data retriever 132 can determine that the requested data comprises a padding in response to receiving the requested data. For example, the data retriever 132 can detect that any number of consecutive zero or one values are located at a beginning or an end of data retrieved from the storage device. In some examples, the data retriever 132 detects a predetermined padding threshold value that indicates a number of repeating binary values that correspond to padding. For example, the data retriever 132 may determine that 64 consecutive zero or one values indicates that retrieved data includes padding. In some embodiments, the data retriever 132 can determine that any number of consecutive zero or one values can determine padding such as thirty-two consecutive repeating binary values, sixty-four consecutive repeating binary values, and the like. If the requested data comprises padding, the process flow continues at block 306.

At block 306, the data retriever 132 can also determine a number of bytes to remove from the data based on a length of the padding. In some embodiments, the data retriever 132 can determine the number of bytes corresponding to the padding based on metadata stored at a beginning or an end of the requested data. For example, the data retriever 132 can determine that the identified padding is to be removed from the data. In some embodiments, the data retriever 132 can also determine if a portion of the padding includes metadata indicating a hash of the unencrypted and uncompressed data, a number of random bytes added to the unencrypted and uncompressed data, and the like. The data retriever 132 can detect the metadata in the padding based on a format definition indicating a location of the metadata in the padding. The data retriever 132 can separate the padding and any associated metadata from the actual encrypted data.

At block 308, the data extractor 134 can extract raw data from the requested data by removing the number of bytes corresponding to the padding, decrypting a portion of the requested data excluding the padding, and decompressing the decrypted portion of the requested data. In some embodiments, the data extractor 134 can use any suitable decompression technique, such as Zlib, LZ4, Snappy, and the like, and decryption technique, such as AES, among others, to extract the raw data. In some embodiments, the data extractor 134 can use metadata from the padding to verify the accuracy of the decrypted and decompressed data. For example, the data extractor 134 can apply an error correction code from the metadata to the decrypted and decompressed data, compare a hash value from the metadata to the decrypted and decompressed data, and the like. If the data extractor 134 detects that the decrypted and decompressed data is corrupt or invalid based on a hash value or error correction code, the data extractor 134 can request a retransmission of the data from the storage device.

At block 310, the instruction manager 136 can execute an instruction with the raw data. For example, the instruction manager 136 can execute a read instruction or operation based on the raw data extracted from the data retrieved from the storage device. The read instruction can correspond to any suitable application, operating system, or hardware device, among others.

In some embodiments, if the requested data does not comprise padding at block 304, the process flow continues at block 312. At block 312, the data extractor 134 can extract raw data from the requested data by decrypting the requested data and returning the decrypted data. As discussed above in relation to block 308, any suitable decryption technique can be used to extract the raw data. The process flow continues to block 310 in which an instruction is executed with the raw data.

The process flow diagram of FIG. 3 is not intended to indicate that the operations of the method 300 are to be executed in any particular order, or that all of the operations of the method 300 are to be included in every case. Additionally, the method 300 can include additional operations. For example, the method 300 can also include determining that the requested data does not comprise the padding, and extracting the raw data from the requested data by decrypting the requested data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
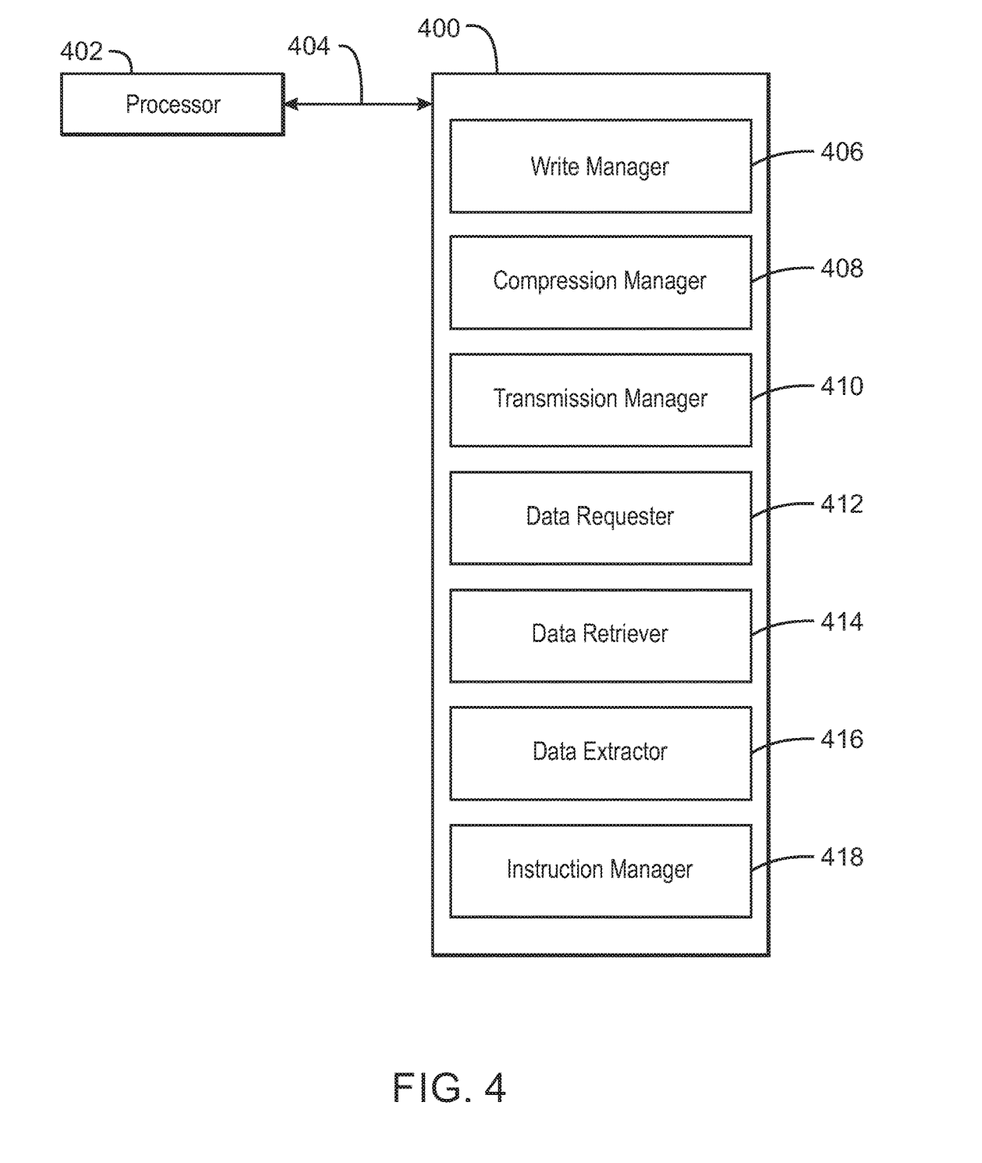
FIG. 4 is a tangible, non-transitory computer-readable medium that can execute instructions based on encrypted and compressed data with padding according to an embodiment described herein.

Referring now to FIG. 4, a block diagram is depicted of an example of a tangible, non-transitory computer-readable medium that can execute instructions based on encrypted and compressed data with padding. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, to execute a write operation, a write manager 406 can detect data to be transmitted to a storage device in response to a write operation. A compression manager 408 can determine that the data comprises a compressible characteristic that enables compression of the data to a size below a threshold value. A transmission manager 410 can generate a modified data block by compressing the data, encrypting the compressed data, and adding a padding to the compressed and encrypted data. The transmission manager 410 can also transmit the modified data block to the storage device.

In some examples, a data requester 412, for a read operation, can send a request for data to a storage device. In some examples, a data retriever 414 can determine that the requested data comprises a padding in response to receiving the requested data. The data retriever 414 can also determine a number of bytes to remove from the data based on a length of the padding. In some embodiments, a data extractor 416 can extract raw data from the requested data by removing the number of bytes corresponding to the padding, decrypting a portion of the requested data excluding the padding, and decompressing the decrypted portion of the requested data. Additionally, an instruction manager 418 can execute an instruction with the raw data.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
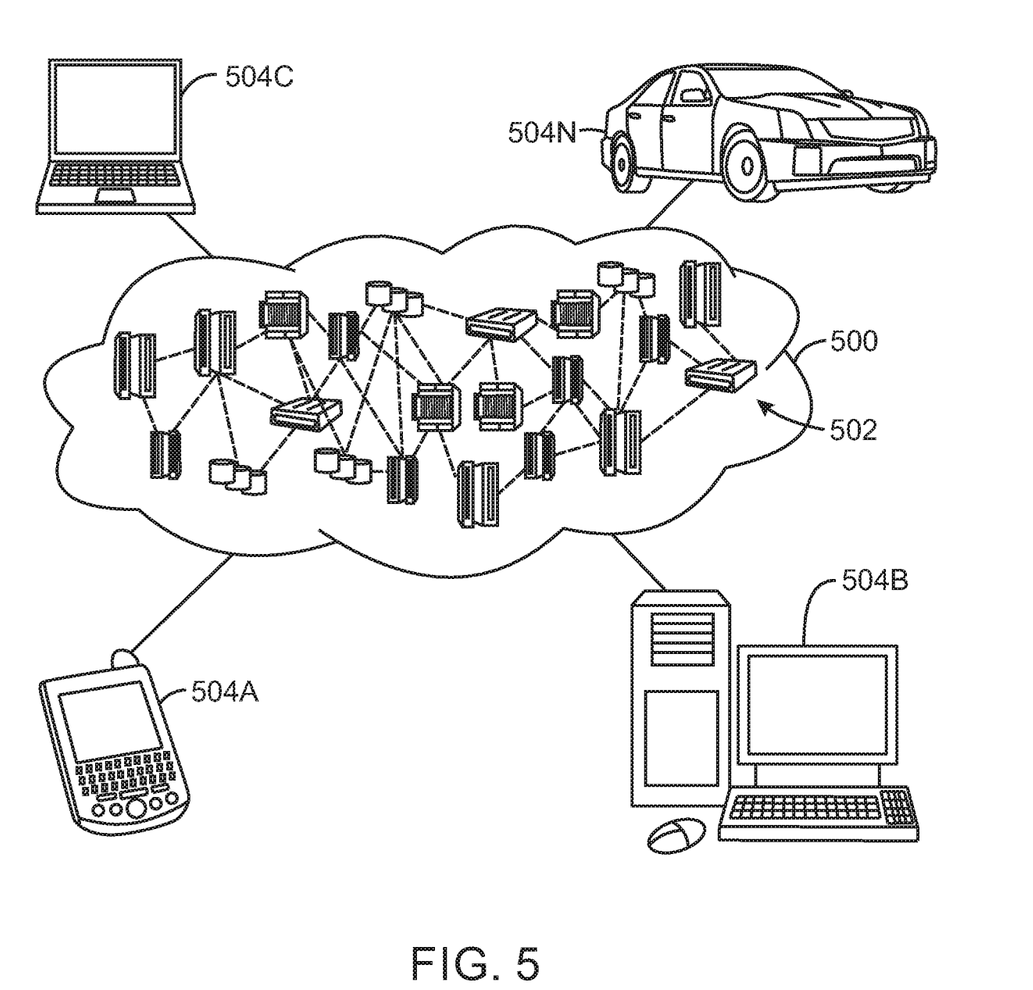
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
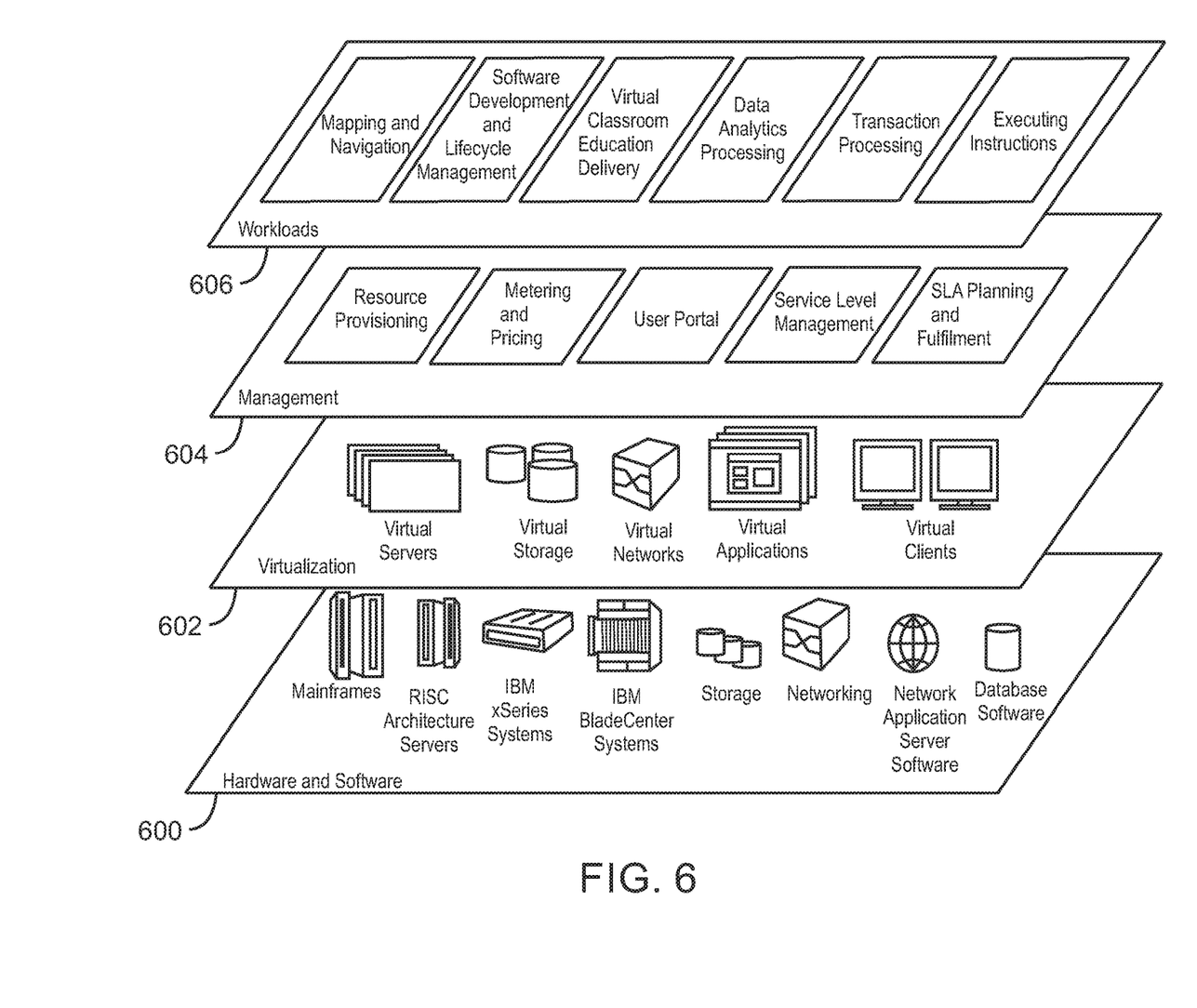
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing instructions based on encrypted and compressed data with padding.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for writing data comprising:
a memory device to provide memory space for the execution of instructions; and
a hardware processor to execute the instructions to:
detect data to be transmitted to a storage device in response to a write operation;
determine that the data comprises a compressible characteristic that enables compression of the data to a size below a threshold value;
add a random number of bytes to the data prior to encryption, and add a value to the data indicating the number of bytes added to the data;
generate a modified data block by encrypting the compressed data, and add a padding to the compressed and encrypted data, wherein to add the padding the hardware processor alternates, for consecutive data blocks, between adding the padding to the end of the compressed and encrypted data and adding the padding to the beginning of the compressed and encrypted data; and
transmit the modified data block to the storage device.

2. The system of claim 1, wherein the storage device is a local storage device or a remote storage device.

3. The system of claim 1, wherein the padding comprises a sequence of zero or one values, or a highly compressible sequence of zero and one.

4. The system of claim 1, wherein the padding comprises metadata indicating a number of bytes corresponding to the padding, and/or a hash of the data in an uncompressed and unencrypted format, and/or an error correction code.

5. The system of claim 1, wherein the hardware processor is to:
determine that the data does not comprise the compressible characteristic; and
generate the modified data block by encrypting the data without compressing the data or adding a padding to the data.

6. The system of claim 1, wherein the hardware processor is to add the padding to a beginning or an end of the compressed and encrypted data.

7. The system of claim 1, wherein the hardware processor is to implement a data pipeline to compress and encrypt the data with a single buffer.

8. The system of claim 1, wherein the hardware processor is to compress and encrypt the data via a hardware accelerator.

9. A system for reading data comprising:
a memory device to provide memory space for the execution of instructions; and
a hardware processor to execute the instructions to:
send a request for data to a storage device and extract raw data from the requested data, wherein to extract the raw data the hardware processor is to:
determine that the requested data comprises a padding in response to receiving the requested data, wherein a position of the padding alternates, for consecutive data blocks, between being at the end of the requested data and being at the beginning of the requested data;
determine a number of bytes to remove from the data based on a length of the padding and the position of the padding;
remove the number of bytes corresponding to the padding, and decrypt a portion of the requested data excluding the padding;
determine a number of random bytes that have been added to the decrypted portion of the requested data;
decompress the decrypted portion of the requested data after removing the random bytes from the decrypted portion; and
execute an instruction with the raw data.

10. The system of claim 9, wherein the storage device is a local storage device or a remote storage device.

11. The system of claim 9, wherein the hardware processor is to determine the number of bytes corresponding to the padding based on metadata stored at a beginning or an end of the requested data.

12. The system of claim 9, wherein the hardware processor is to:
determine that the requested data does not comprise the padding; and
extract the raw data from the requested data by decrypting the requested data.

13. A computer program product for executing instructions comprising a computer readable storage medium having program instructions embodied therewith, wherein the computer readable storage medium is not a transitory signal per se, and wherein the program instructions are executable by a processor to cause the processor to:
detect data to be transmitted to a storage device in response to a write operation;
determine that the data comprises a compressible characteristic that enables compression of the data to a size below a threshold value;
add a random number of bytes to the data prior to encryption, and add a value to the data indicating the number of bytes added to the data;

generate a modified data block by encrypting the compressed data, and add a padding to the compressed and encrypted data, wherein to add the padding the hardware processor alternates, for consecutive data blocks, between adding the padding to the end of the compressed and encrypted data and adding the padding to the beginning of the compressed and encrypted data; and transmit the modified data block to the storage device.

14. The computer program product of claim 13, wherein the padding comprises metadata indicating a number of bytes corresponding to the padding, a hash of the data in an uncompressed and unencrypted format, or an error correction code.

15. The computer program product of claim 13, wherein the program instructions cause the processor to determine that the data does not comprise the compressible characteristic; and generate the modified data block by encrypting the data without compressing the data or adding a padding to the data.

16. The computer program product of claim 13, wherein the program instructions cause the processor to:

send a request for the modified data block to the storage device;

determine that the requested modified data block comprises a padding in response to receiving the requested modified data block;

determine a number of bytes to remove from the modified data block based on a length of the padding;

extract raw data from the requested modified data block by removing the number of bytes corresponding to the padding, decrypting a portion of the requested modified data block excluding the padding, and decompressing the decrypted portion of the requested modified data block; and execute an instruction with the raw data.

17. The computer program product of claim 13, wherein the program instructions cause the processor to:

determine that the requested data does not comprise the padding; and extract the raw data from the requested data by decrypting the requested data.

* * * * *